April 28, 1964 G. F. KNOWLES 3,130,698
ROTARY CAN DOMER AND TRIMMER
Filed Sept. 25, 1961 7 Sheets-Sheet 1

INVENTOR.
GEORGE F. KNOWLES
BY Bertha L. MacGregor
ATTORNEY

INVENTOR.
GEORGE F. KNOWLES
BY Bertha L. MacGregor
ATTORNEY

INVENTOR.
GEORGE F. KNOWLES
BY Bertha L. MacGregor
ATTORNEY

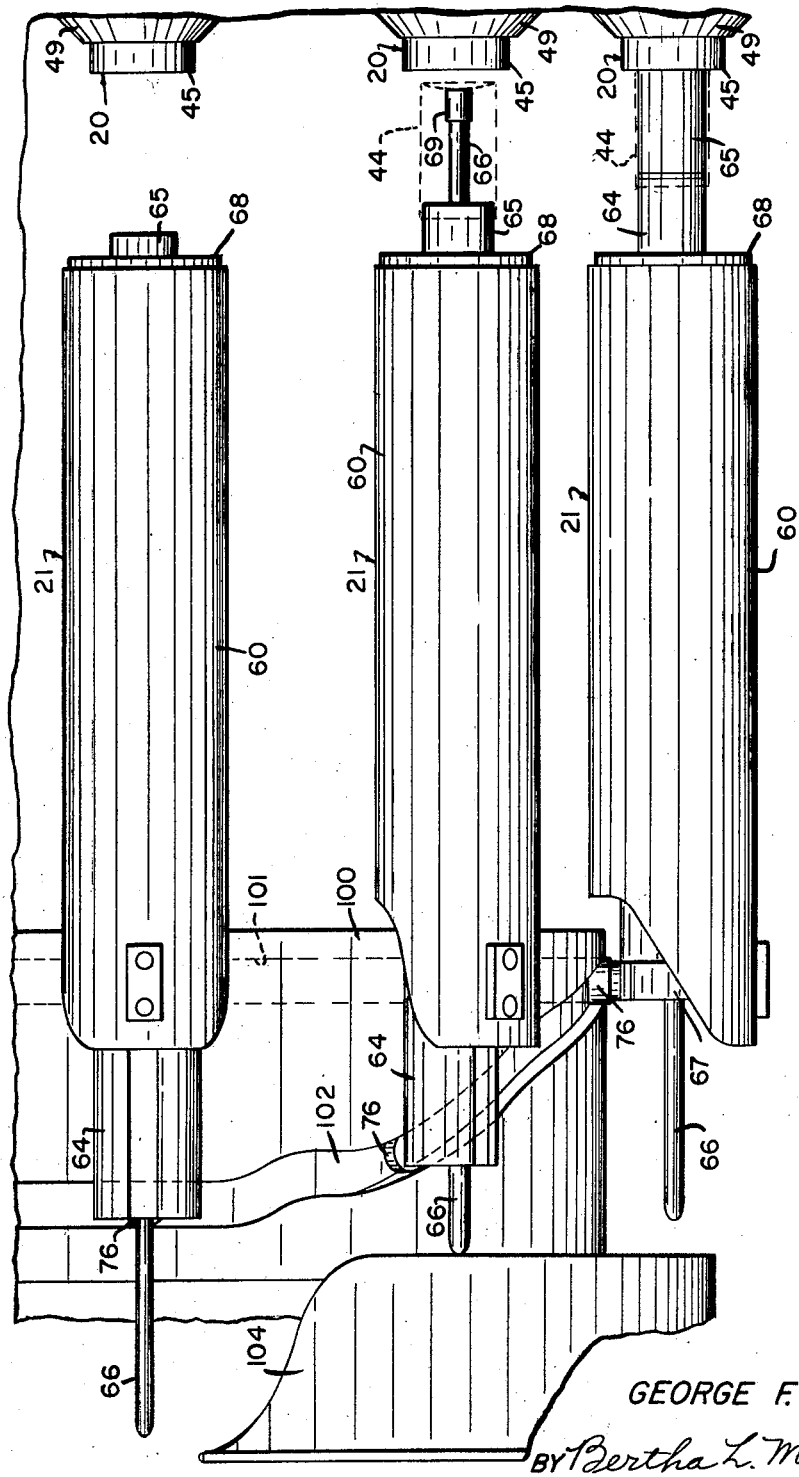

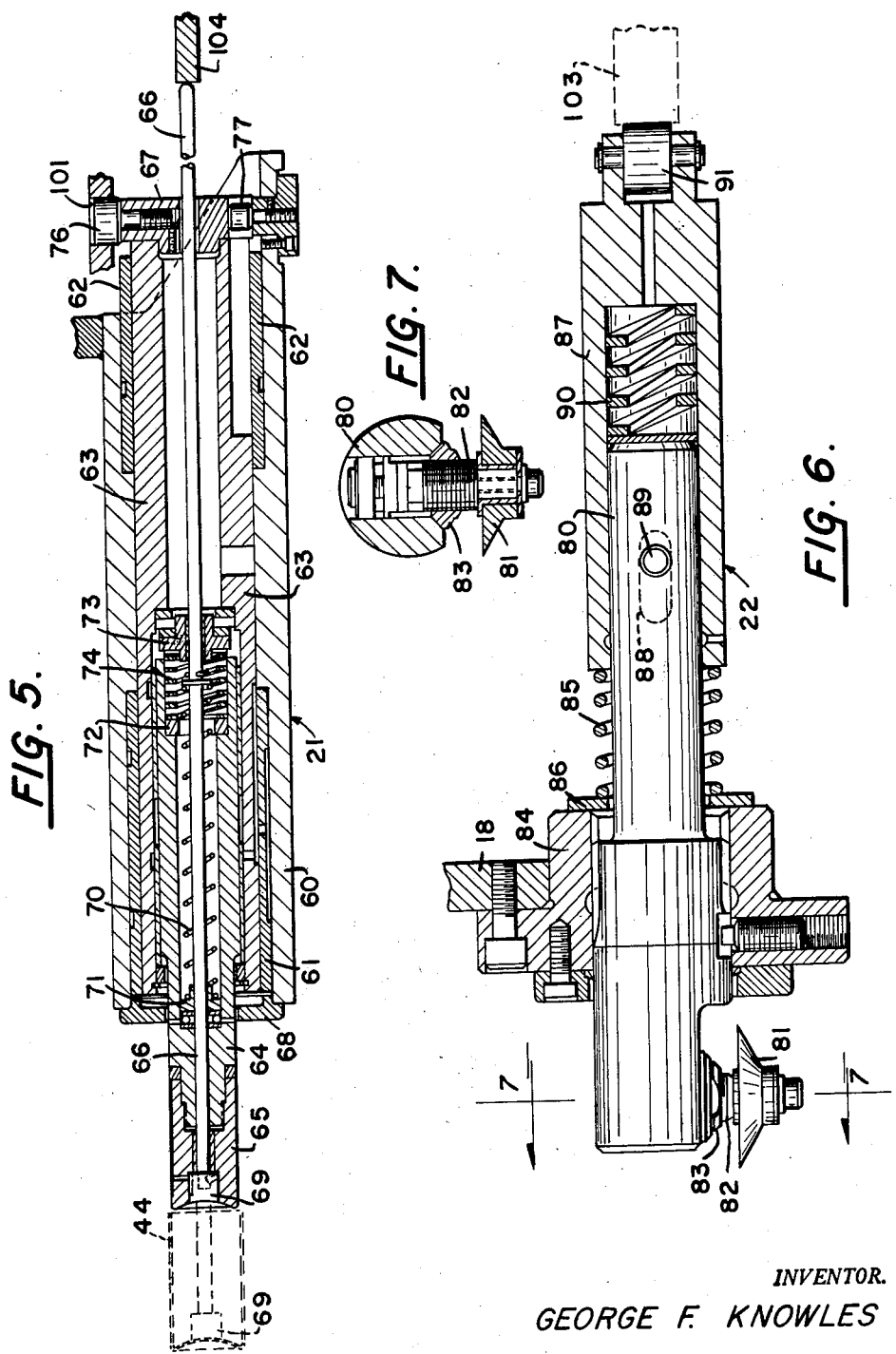

April 28, 1964  G. F. KNOWLES  3,130,698
ROTARY CAN DOMER AND TRIMMER
Filed Sept. 25, 1961  7 Sheets-Sheet 7

INVENTOR.
GEORGE F. KNOWLES
BY Bertha L. MacGregor
ATTORNEY 3,130,698
ROTARY CAN DOMER AND TRIMMER
George F. Knowles, Golden, Colo., assignor to Coors Porcelain Company, Golden, Colo., a corporation of Colorado
Filed Sept. 25, 1961, Ser. No. 140,577
20 Claims. (Cl. 113—7)

This invention relates to a rotary can trimmer and domer designed to cut the cylindrical bodies of cans to predetermined length and to shape the integral bottoms of the cans to externally concave form in a continuous operation.

The machine comprises a rotated cylindrical housing, horizontally axially disposed, in which are mounted a plurality of cooperating die spindle assemblies, punch spindle assemblies and cutter assemblies. The die spindles are rotated about their axes while being moved bodily with the rotated housing in an annular path concentric with the axis of the housing. The punch spindles are equal in number to the die spindles, extendible and retractable in axial directions, and each punch spindle is axially aligned with a die spindle, both parallel to the housing axis, for performing the doming operation.

The cutter assemblies are also equal in number to the punch spindle assemblies and are extendible and retractable in radial directions for trimming the cylindrical bodies of cans when mounted on punch spindles and previously domed by the cooperative action of the opposing punch and die spindles.

A single source of power, such as an electric motor, rotates the cylindrical housing, and rotation of the housing imparts rotary motion to the die spindles about their axes. Rotary motion is imparted to the punch spindles by the rotated die spindles during the doming operation by frictional engagement between the facing ends of the die and punch spindles, with a cam bottom between them; and rotary motion is imparted to the cutters during the cutting operation by frictional engagement between a cutter and associated punch spindle, with a can body between the cutter edge and the side of the punch spindle.

The extending of the punch spindles and the cutter spindles into their operative positions and retraction thereof to inoperative positions are achieved by cam assemblies actuated by the rotation of the housing which carries the punch spindles and cutters in annular paths.

The punch spindles each include stripper means also controlled by cam assemblies actuated by the rotation of the housing without the aid of power other than that provided for rotating the housing.

Due to the construction, location and arrangement of parts aforementioned, all controlled by the single source of power applied to rotation of the housing in which the parts are mounted, the doming and trimming of cans are achieved in a continuous operation, at high speed, by perfectly coordinated movements of the machine parts.

Other objects and advantages of the invention will become apparent from the drawings and following specification.

In the drawings:

FIG. 4 is an enlarged elevational side view of the rearward part of the left side of the machine, with the housing omitted, showing three of the punch spindles assemblies and strippers in different operative positions. Punch spindle assemblies located circumferentially of the housing between the three punch spindles shown in this view have been omitted for sake of clarity.

FIG. 5 is a longitudinal vertical sectional view of one of the punch spindle assemblies including the stripper mechanism, as viewed from the right side of the machine.

FIG. 6 is an elevational side view, partly in section, of one of the cutter assemblies.

FIG. 7 is a transverse sectional view in the plane of the line 7—7 of FIG. 6.

Figure 1:
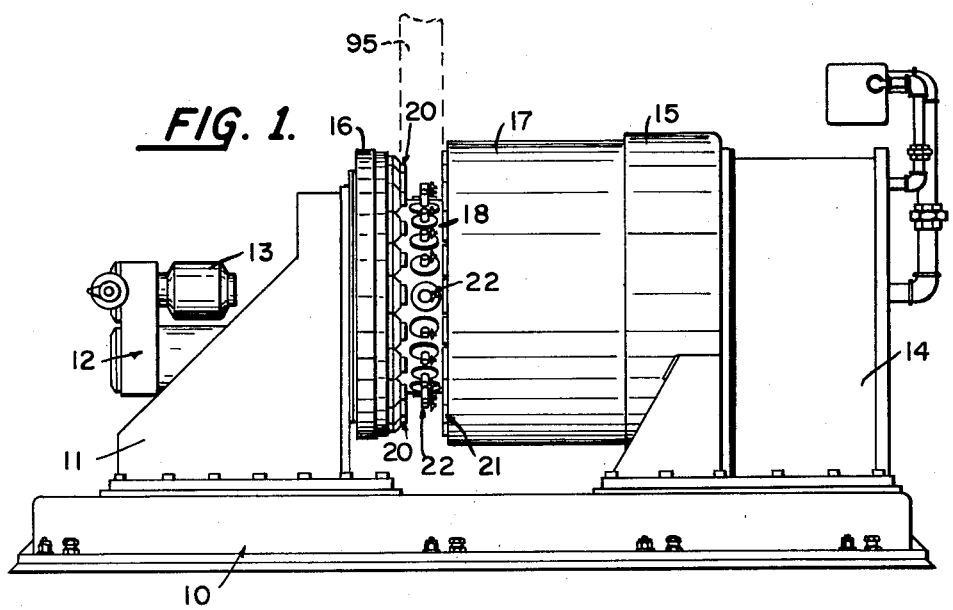
FIG. 1 is a side elevational view of a rotary can domer and trimmer embodying my invention.
Figure 2:
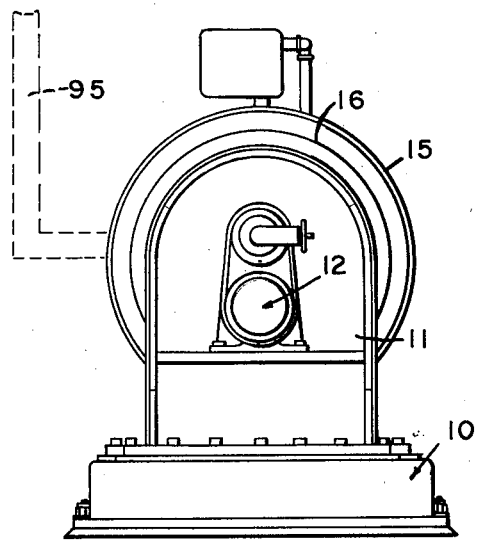
FIG. 2 is a front elevational view thereof.

In the preferred embodiment of the invention shown in the drawings, the machine comprises a horizontally disposed base 10, a stationary gear housing 11 on the base, a smaller gear casing 12 and motor 13 supported on the gear housing 11 at the front end of the machine. A rearward stationary housing 14 on base 10 has an adjacent section provided with hinged walls 15 which may be lifted for access to the interior of the machine.

Figure 3A:
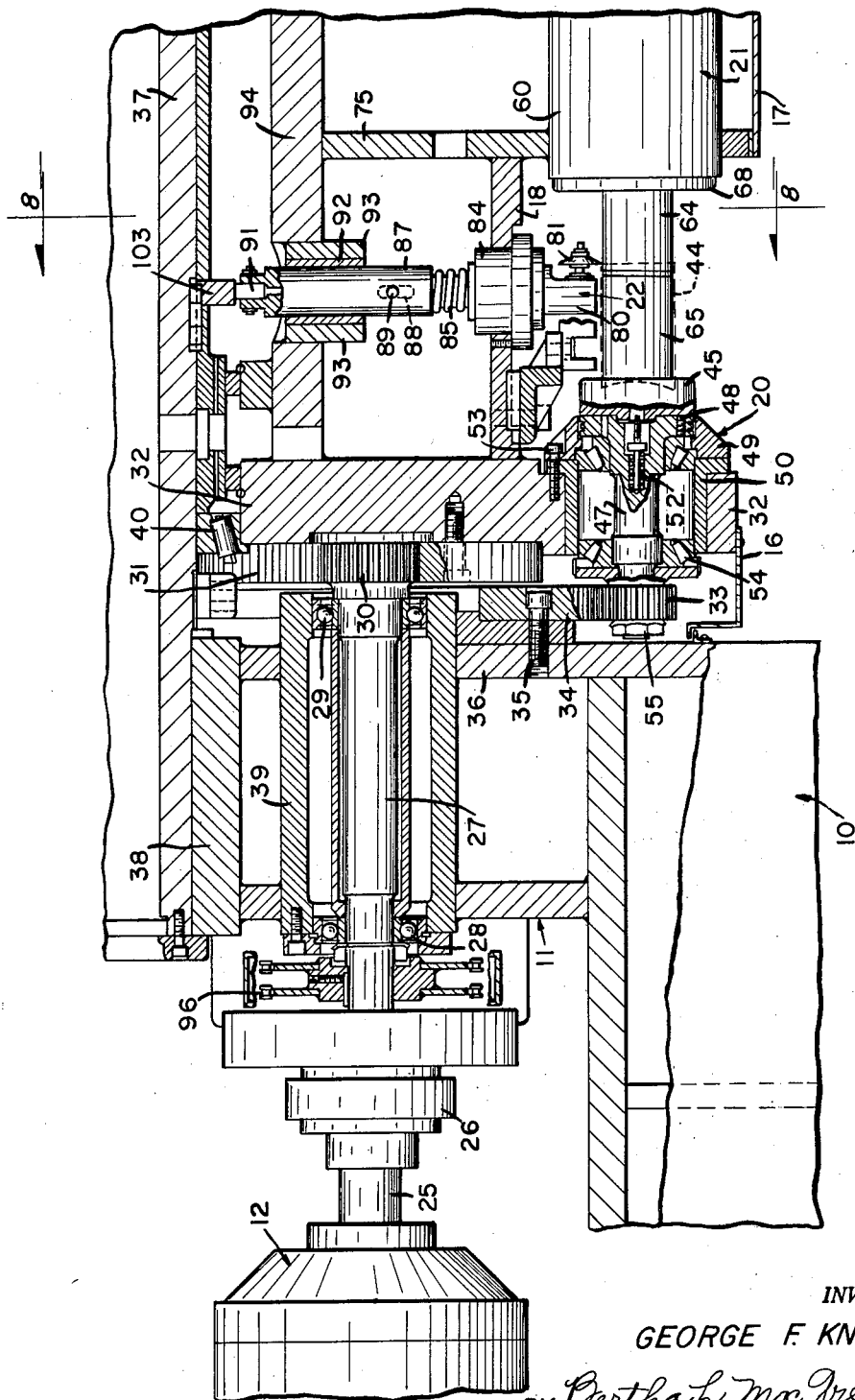
FIG. 3a is an elevational side view, partly in section, of the forward part of the right side of the machine, with part of the housing omitted.

A rotatable cylindrical housing located between the stationary housings 11 and 14—15, comprises a forward axially short drum 16 and a rearward axially longer drum 17, concentric and axially aligned, connected together by a smaller diameter portion 18 (FIGS. 1 and 3a).

Figure 12:
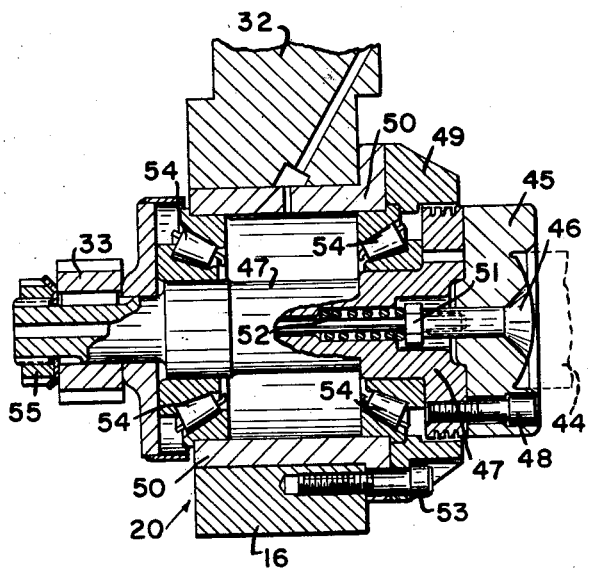
FIG. 12 is a longitudinal vertical sectional view of part of the die spindle assembly shown in FIG. 3a, but on an enlarged scale.

The drum portion 16 of the rotatable housing has mounted thereon a plurality of die spindle assemblies indicated as a whole at 20 in FIGS. 1, 3a and 12. The portion 17 has mounted therein a plurality of punch spindle assemblies indicated as a whole at 21 in FIGS. 1, 3a, 3b, 4 and 5. The intermediate portion 18 has mounted therein a plurality of cutter assemblies indicated as a whole at 22 in FIGS. 1, 3a and 6. In the embodiment shown in the drawings, twenty of each of the die spindle assemblies, punch spindle assemblies and cutter assemblies are equally spaced apart circumferentially of the housing, the die spindle assemblies 20 and punch spindle assemblies 21 being axially parallel to the axis of the housing and the cutter assemblies 22 extending radially toward and through the wall 18.

The housing 16–18 is rotated by the following described mechanism shown in FIGS. 1 and 3a, the gear housing 11 being omitted in the latter view. The motor 13, through gearing in housing 12, rotates shaft 25 coupled at 26 to shaft 27 mounted in bearings 28, 29. Shaft 27 has mounted on its inner end a pinion 30 in mesh with an internally toothed ring gear 31 fixed on the inside of the housing 16 by a mounting plate 32. Rotation of the pinion 30 thus rotates the housing 16–18. A pinion 33 keyed to the end of a die spindle in each assembly 20 engages a stationary gear 34 on stub shaft 35 fixedly mounted in the wall 36 adjacent the rear of the gear housing 11. Rotation of the housing 16–18, carrying the die spindle assemblies 20 therewith, thus produces rotation of the die spindles due to the engagement between the stationary gear 34 and pinions 33 keyed to the die spindles.

Figure 9:
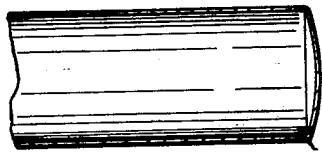
FIG. 9 is an elevational side view of an untrimmed, undomed can.
Figure 10:
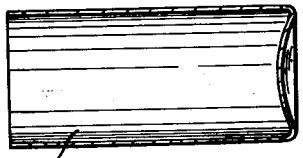
FIG. 10 is a similar view of a can trimmed and domed by the machine of this invention.

The horizontal axial center of the rotatable housing 16–18 is a stationary tubular shaft 37 (FIGS. 3a and 8), supported in sleeve 38 by frame 39 in gear housing 11. The said housing 16–18 and mechanism carried thereby rotate about bearings 40 on shaft 37. In FIG. 9, an untrimmed undomed can is indicated at 43, and in FIGS. 3a, 10 and 12, a trimmed domed can is indicated at 44.

*Domer die spindle assemblies.*—Referring to FIGS. 3a and 12, each assembly 20 comprises a doming die 45 provided with a valve 46, the die 45 being mounted on a spindle 47 by screws 48. A bearing cap 49 is secured to the spindle sleeve 50. A valve adapter 51 and valve spring 52 in spindle 47 insure removal of the domed can 44 from the die 45. The spindle sleeve 50 is fixedly attached by screws 53 to the mounting plate 32 heretofore mentioned which may be a part of or be attached to the housing drum 16. Roller bearings 54 are provided between the spindle 47 and sleeve 50. The pinion 33 is retained on the reduced end of the die spindle by a lock nut 55.

Figure 3B:
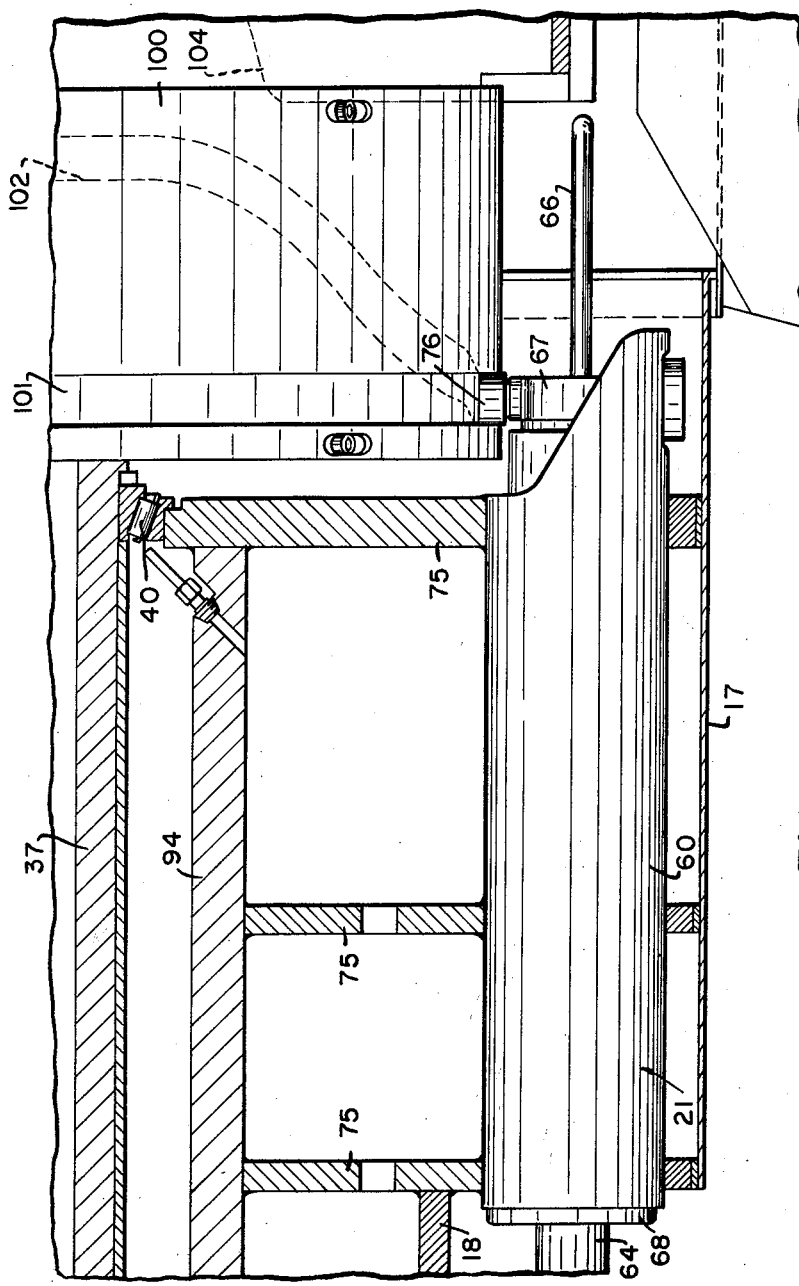
FIG. 3b is a continuation of the same, the two figures being on separate sheets to permit enlargement of parts.

*Punch spindle assemblies.*—Referring to FIGS. 3a, 3b and 5, each punch spindle assembly 21 comprises a tubular casing 60 enclosing a punch outer front bearing 61 and a punch outer rear bearing 62 engaging a spindle sleeve 63 in which is mounted a punch spindle 64. A doming punch 65 is mounted on the forward end of spindle 64 and is provided with an axial bore through which extends a stripper rod 66. The rearward end of rod 66 projects beyond the stripper bearing 67. The rod also extends through a radial stripper plate 68. The forward end of the rod 66 is provided with a head 69. A stripper spring 70 is confined between the spring seat 71 and punch spring washer 72 which cooperates with the punch spring seat 73 to confine the punch spring 74. The spring 74 is a 1500 lb. load die spring which automatically compensates for variations in dimensions of parts and obviates necessity for fine adjustment of opposed die and punch spindles.

The punch spindle assemblies 21 are mounted by mounting plates 75 on the inside of the housing drum 17 and are carried by the rotated housing as shown in FIG. 3b. At the rearward end of each punch spindle, the stripper bearing 67 has rotatably mounted thereon a cam follower 76 and guide roller 77 which will be referred to later in the description of operation of the machine.

*Cutter assemblies.*—Referring to FIGS. 3a, 6, 7 and 8, each cutter assembly 22 comprises a cutter spindle 80 on which is mounted a cutter 81 by a threaded member 82 and adjusting nut 83. The spindle 80 is mounted for movement in axial directions in spindle housing 84 fixedly mounted in wall 18 of the rotated housing. Thus the cutter 81 is located radially outwardly of the annular wall 18, as shown in FIG. 3a, between said wall and the punch spindle 64. A spring 85 surrounds the reduced diameter portion of the spindle 80 and is seated between the washer 86 and cam roller spindle 87 mounted on the inner end of spindle 80. The cam roller spindle 87 has limited longitudinal movement relatively to the spindle 80 by reason of the slot and pin connection 88, 89. A die spring 90 in the hollow spindle 87 bears against the inner end of the cutter spindle 80 to urge the spindle and cutter 81 into cutting positions at all times regardless of variations in dimensions or adjustment of parts. The cam roller spindle 87 has mounted on its free end a cam follower 91 to be referred to hereinafter in the description of operation.

The cam roller spindle 87 and parts connected thereto are mounted for limited movement in axial directions in the bearing 92 and collar 93. The parts 92, 93 are fixedly mounted in a sleeve 94 which is axially parallel to the stationary hollow shaft 37. The sleeve 94 and cutter assemblies 22 mounted therein are carried by the housing 16–18 and thus travel in an annular path as heretofore explained.

*Operation.*—Housing 16–18 is rotated continuously by motor 13, shaft 25 coupled to shaft 27 which rotates pinion 30 on shaft 27; pinion 30 meshing with toothed ring gear 31 fixedly connected to the interior of the rotatable housing.

Rotation of the housing 16–18 imparts continuous rotary motion to the die spindles 47 about their axes by reason of the die spindle assemblies 20 being carried in annular paths by the housing 16 and the toothed engagement of die spindle pinions 33 and stationary gear 34.

Cans 43 are fed from a chute indicated in dotted lines 95 in FIG. 1, or by any suitable conveyor, to one side of the machine into the annular recess between the drums 16 and 17 and radially outwardly of the wall 18. In the embodiment shown, the feed is at the left side of the machine, where the punch spindles 64 of the assemblies 21 are in retracted positions, thus providing space between facing doming dies 45 and doming punches 65 for reception of cans 43. In FIG. 1, all the punch spindles are shown retracted, for clarity, but as will be explained hereinafter, some of the punch spindles are extended or partially extended while the remaining ones are retracted. The feeding of the cans may be controlled by mechanism such as indicated at 96 in FIG. 3a, mounted on shaft 27, to correlate the rate of feed to the operation of the machine.

Cans 43 fed to the machine are retained in axially horizontal position by any suitable means such as a spring pressed curved arm (not shown), to locate the cans between opposed doming dies and doming punches.

Figure 11:
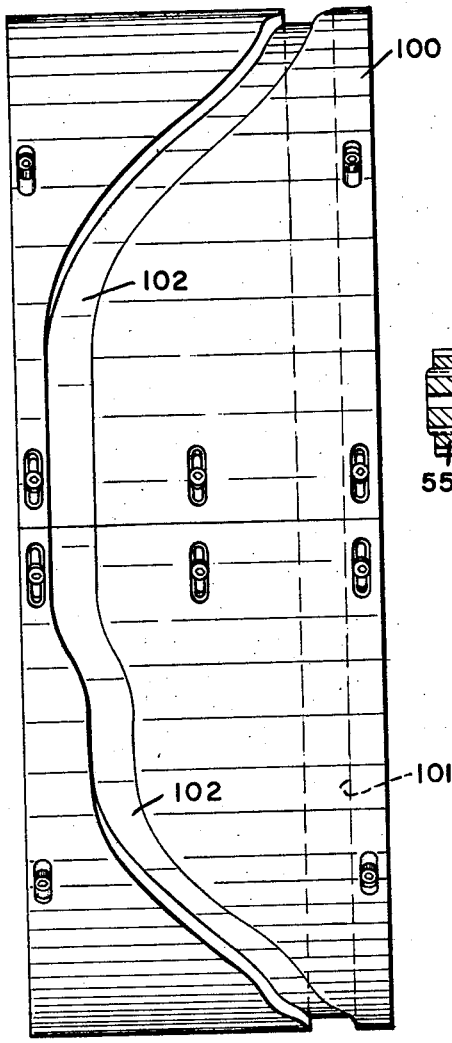
FIG. 11 is an elevational view of the punch spindle cam as it appears when viewed from the left side of the machine.

The cans are carried by the rotating housing 16–18 before doming occurs, during part of a revolution, until the punch spindles 64 are cam actuated to move gradually into extended doming positions into the open ends of the cans 43. The punch spindle actuating means are shown in FIGS. 3b, 4 and 11, comprising a stationary cylindrical drum 100, smaller in diameter than the interior of the housing, mounted in the rearward part 14 of the machine. The external surface of the drum 100 is provided with a cam groove which in its part 101 (FIG. 3b) extends in a circumferential direction along the forward edge of the drum 100 at the right side of the machine. The remaining part 102 of the groove (FIGS. 4 and 11) is curved longitudinally and located rearwardly of the forward edge of the drum at the left side of the machine. The groove is engaged by the cam rollers 76 on punch spindles 64. The shape of the groove is such that spindles whose rollers 76 are engaged in the groove part 101 are extended in doming positions, while the spindles 64 whose rollers 76 are engaged in the groove part 102 are retracted or partially retracted as shown in FIG. 4. In that view, the upper spindle is fully retracted and spaced from its opposed die spindle assembly 20; the lowermost punch spindle is in extended doming position; and the intermediate punch spindle is partially retracted. As heretofore mentioned, punch spindles located between the three shown in FIG. 4 have been omitted for sake of clarity.

Doming of the can bottoms occurs when each punch spindle 64 reaches fully extended position as shown in FIGS. 3a and 3b, at which time the cam followers 76 are engaged in the cam groove part 101 and the face of the domer die 45 contacts the outer surface of the cam bottom while the face of the punch die 65 contacts the inner surface of the can bottom. Due to the shape of the cam groove part 101, several of the twenty punch spindles are in doming positions at the same time.

While in doming position, one of the punch spindles 64 with domed can held thereon, as shown in FIG. 3a, presents the can body to the trimming operation. The cutter 81 is forced into cutting position by movement of the cutter spindle 80 in an outwardly radial direction, controlled by the cam roller spindle 87 which has mounted thereon the cam roller 91. The roller 91 follows the surface of a cam 103 stationarily mounted on the stationary shaft 37 (FIGS. 3a and 8).

Figure 8:
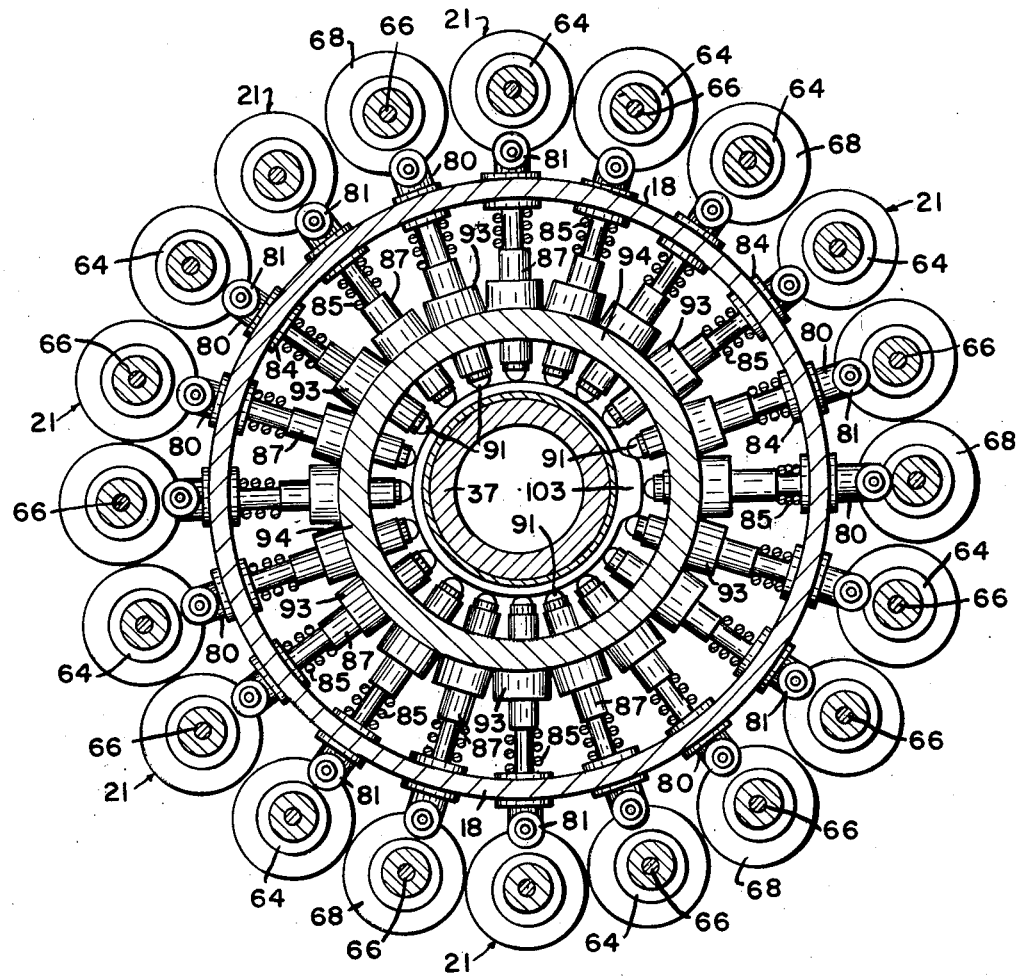
FIG. 8 is a transverse vertical sectional view in the plane of the line 8—8 of FIG. 3a, looking in the direction indicated by the arrows.

Rotation of the housing 16–18 carrying the cutter assemblies thus moves the cam rollers 91 successively over the working edge of cam 103 as shown in FIG. 8, so that one cutter spindle 80 is partially extended radially, the adjacent one is fully extended into cutting position, and the next adjacent one is partially retracted. All the other cutters are in retracted non-cutting positions. Cutting rotation is imparted to the cutters 81 by frictional engagement of the cutter edge with a can body while the latter is held on its punch spindle and the can and spindle are carried in an annular path by rotation of the housing, and during the cutting the punch spindle also is rotated about its axis by frictional engagement with the rotated domer die spindle.

When a can has been domed and trimmed to the form of can 44, continued rotation of housing 16–18 causes the punch spindle holding that can to be partially retracted by cam roller 76 in cam groove 102 as shown by the middle punch assembly in FIG. 4. At the same time, the stripper rod 66 contacts the stripper cam 104 stationarily mounted in the rearward housing 14. This contact causes the stripper rod 66 to be extended forwardly beyond the end face of the punch spindle 64 so that the stripper head 69 engages the inner surface of the can bottom and moves the can off the spindle 64. The domer die valve 46 aids in the removal of the can.

When the stripper rod 66 has moved out of contact with the cam 104, as shown by the upper punch spindle in FIG. 4, the stripper rod moves rearwardly under influence of the stripper spring 70 (FIG. 5), and the punch 65 on spindle 64 is retracted by cam follower 76 in groove 102, thereby withdrawing from the trimmed and domed can which then is ready to be conveyed from the machine by any suitable means.

The cams which control the axial movements of the punch spindles and the radial movements of the cutter spindles as shown in this embodiment of the invention are designed for doming and cutting cans fed in a single row to one side of the machine. The trimming of a can requires more time than does the doming operation. However, the production of domed trimmed cans may be doubled or trebled over the output attained by the machine as shown and described herein by simply altering the form of the punch spindle groove 101—102, cutter cam 103 and stripper cam 104; that is, to double the output, cans may be fed into the machine in two rows, one at each side of the machine, and the cam groove and other cam conformations herein shown as each comprising a single circumferential working area may be modified to comprise duplicate working areas spaced apart 180 degrees from each other, on the respective cam surfaces. The present production of domed trimmed cans fed to the machine of this invention in a single line, is 265 per minute.

From the foregoing it will be understood that the rotation of the connected housing drums 16, 17, 18, by motor 13, automatically produces the following results: (1) rotation of the plurality of die spindles about their axes; (2) reciprocating movement of punch spindles in the direction of their axes; (3) rotary motion of the punch spindles about their axes while in doming contact with the rotated die spindles; (4) reciprocating movement of stripper rods in the punch spindles in the direction of their axes; (5) reciprocating movement of cutter spindles in radial directions; and (6) rotary cutting movement of the cutters while in cutting contact with can carrying punch spindles and the latter are in doming contact with rotated die spindles. Thus completely dependable and speedy operation of the doming and trimming mechanism is assured.

The specific construction and arrangement of parts herein illustrated are for exemplary purposes only and it should be understood that the principles of the invention embrace variations and modifications thereof which come within the scope of the following claims.

I claim:

1. A rotary can domer and trimmer comprising a cylindrical housing, means rotating the housing, a plurality of domer die spindle assemblies, a plurality of domer punch spindle assemblies, a plurality of cutter assemblies, each of said plurality of assemblies being connected to the housing and movable therewith in an annular path, a die spindle rotatably mounted in each domer die assembly, means in the housing and means on each die spindle cooperating with each other to rotate the die spindles when the housing is rotated, a punch spindle reciprocably mounted in each punch spindle assembly, each die spindle being axially aligned with a punch spindle, means in the housing and means on each punch spindle cooperating with each other to impart reciprocatory movement to said punch spindles when the housing is rotated, for moving each punch spindle axially toward a die spindle into doming contact therewith, a cutter spindle reciprocably mounted in each cutter assembly, a cutter rotatably mounted on each cutter spindle, and means in the housing and means on each cutter spindle cooperating with each other to impart reciprocatory movement to said cutter spindles when the housing is rotated and thereby move the cutters successively into can trimming contact with a can body on a punch spindle.

2. The can domer and trimmer defined by claim 1, in which each punch spindle when in doming position is rotated by a die spindle, and each cutter when in can trimming position is rotated by a punch spindle.

3. The can domer and trimmer defined by claim 1, in which the domer die spindle assemblies and the domer punch spindle assemblies are axially parallel to the axis of the housing and the cutter assemblies extend radially outwardly through the housing into a space adjacent the sides of the punch spindles when in doming positions.

4. The can domer and trimmer defined by claim 1, in which the means rotating the housing comprises a motor driven shaft extending axially into the housing, a pinion keyed to the shaft, and an internally toothed ring gear fixedly connected to the housing to rotate therewith and engaged by said pinion.

5. The can domer and trimmer defined by claim 1, in which the means rotating the die spindles comprises a pinion fixed on the end of each die spindle and a stationary toothed gear in the housing engaged by the pinion.

6. The can domer and trimmer defined by claim 1, in which the means imparting reciprocatory movement to the punch spindles comprises a stationary cam drum in the housing, said drum being provided with a circumferentially located curved groove, a cam follower mounted on each punch spindle and engaged in the groove whereby some of the plurality of punch spindles are extended into doming positions relatively to the die spindles and others are retracted to inoperative positions when the housing is rotated.

7. The can domer and trimmer defined by claim 1, in which the means for imparting reciprocatory movement to the cutter spindles comprises a stationary cam axially concentric with the housing, and a cam follower mounted on the inner end of each cutter spindle, said cam followers being moved over the periphery of the cam by rotation of the housing to successively move said cutter spindles into cutting positions.

8. The can domer and trimmer defined by claim 1, which includes a can stripper reciprocably mounted in each punch spindle, and means in the housing and means on each stripper cooperating with each other to impart reciprocatory movement to the stripper when the housing is rotated.

9. The cam domer and trimmer defined by claim 8, in which each can stripper comprises a stripper rod, a head on its forward end and a cam follower on its rearward end, and the means imparting reciprocatory movement to the stripper comprises a stationary cam in the housing engaged by the cam follower.

10. A continuous rotary can domer and trimmer comprising a rotatable horizontally disposed housing which includes a first, a second and a third cylindrical housing member concentric and connected together, the second member being smaller in diameter than the others, said members being connected to form an open face circumferential recess for reception of cans between the first and third members, a plurality of domer die spindles mounted in the first housing member, a plurality of domer punch spindles mounted in the third member, a plurality a cutter spindles radially reciprocably mounted in the second member, each domer die spindle being axially aligned with a domer punch spindle, one of each of said aligned spindles being mounted to be movable into doming contact with the other spindle of said aligned spindles, a cutter on each cutter spindle movable toward the side of one of said aligned spindles into cutting position, means rotating the housing, means rotating one of said aligned spindles and reciprocating the other, and means reciprocating the cutter spindles.

11. The can domer and trimmer defined by claim 10, in which the means rotating the housing comprises a motor driven shaft extending axially into the housing, a pinion keyed to the shaft, and an internally toothed ring gear fixedly connected to the housing to rotate therewith and engaged by said pinion.

12. The can domer and trimmer defined by claim 10, which includes means rotating the domer die spindles comprising a pinion fixed on the end of each die spindle and a stationary toothed gear in the housing engaged by the pinion.

13. The can domer and trimmer defined by claim 10, which includes means imparting reciprocatory movement to the punch spindles comprising a stationary cam drum in the housing, said drum being provided with a circumferentially located curved groove, a cam follower mounted on each punch spindle and engaged in the groove whereby some of the plurality of punch spindles are extended into doming positions relatively to the die spindles and others are retracted to inoperative positions when the housing is rotated.

14. The can domer and trimmer defined by claim 10, in which the means reciprocating the cutter spindles comprises a stationary cam axially concentric with the housing, and a cam follower mounted on the inner end of each cutter spindle, said cam followers being moved over the periphery of the cam by rotation of the housing to successively move said cutter spindles into cutting positions.

15. A continuous rotary can domer and trimmer comprising a cylindrical housing, means rotating the housing, a first and a second group of circumferentially spaced apart cooperating domer spindles mounted in the housing, the spindles of one group being axially aligned with the spindles of the second group, a plurality of radially extending cutter spindles mounted in the housing, a cutter rotatably mounted on each cutter spindle, means actuated by rotation of the housing rotating the spindles of said first group, means actuated by rotation of the housing reciprocating the spindles of said second group, and moving them into doming contact with spindles of the first group, rotation of the spindles of said first group imparting rotary motion to spindles of the second group when in doming contact, and means actuated by rotation of the housing reciprocating the cutter spindles and moving the cutters into cutting contact with domer spindles, the imparted rotary motion of spindles of the second group imparting rotary motion to the cutters by contact with the peripheral edges of the cutters when in cutting positions relatively to said spindles.

16. A continuous rotary can domer and trimmer comprising a cylindrical housing, means rotating the housing, a group of circumferentially spaced apart domer die spindles mounted in the housing, a group of domer punch spindles mounted in the housing axially aligned with the domer die spindles, a plurality of radially extending cutter spindles mounted in the housing, a cutter rotatably mounted on each cutter spindle axially at right angles to said cutter spindle, means actuated by rotation of the housing rotating said domer die spindles, means actuated by rotation of the housing reciprocating the domer punch spindles and moving them into doming contact with the domer die spindles, rotation of said domer die spindles imparting rotary motion to said domer punch spindles when in doming contact, and means actuated by rotation of the housing reciprocating the cutter spindles and moving the cutters into cutting contact with the domer punch spindles, the imparted rotary motion of the domer punch spindles imparting rotary motion to the cutters by contact with the peripheral edges of the cutters when in cutting positions relatively to said domer punch spindles, each of said domer punch spindles and each of said cutter spindles comprising a tubular casing, a head movably mounted therein, and a die spring in the casing which exerts constant heavy pressure against said head and urges it into operative position and automatically compensates for variations in dimensions and adjustment of parts.

17. A continuous rotary can domer and trimmer comprising a cylindrical housing, means rotating the housing a group of circumferentially spaced apart domer die spindles mounted in the housing, a group of domer punch spindles mounted in the housing axially aligned with the domer die spindles, a plurality of radially extending cutter spindles mounted in the housing, a cutter rotatably mounted on each cutter spindle axially at right angles to said cutter spindle, means actuated by rotation of the housing rotating said domer die spindles, means actuated by rotation of the housing reciprocating the domer punch spindles and moving them into doming contact with the domer die spindles, rotation of said domer die spindles imparting rotary motion to said domer punch spindles when in doming contact, and means actuated by rotation of the housing reciprocating the cutter spindles and moving the cutters into cutting contact with the domer punch spindles, the imparted rotary motion of the domer punch spindles imparting rotary motion to the cutters by contact with the peripheral edges of the cutters when in cutting positions relatively to said domer punch spindles, said means for rotating the housing comprising a motor driven shaft axially parallel to the housing axis extending into the housing, a pinion keyed to the shaft, and an internally toothed ring gear connected to the interior of the housing and engaged by said pinion.

18. The rotary can domer and trimmer defined by claim 17, in which the means actuated by rotation of the housing rotating the domer die spindles comprises a pinion keyed to each domer die spindle and a stationary toothed gear in the housing engaged by said pinion.

19. The rotary can domer and trimmer defined by claim 17, in which the means actuated by rotation of the housing reciprocating the domer punch spindles comprises a stationary grooved cam drum in the housing and a cam follower mounted on each punch spindle and engaged in the cam groove.

20. The rotary can domer and trimmer defined by claim 17, in which the means actuated by rotation of the housing reciprocating the cutter spindles comprises a stationary cam axially concentric with the housing, and a cam follower mounted on the inner end of each cutter spindle contacting the peripheral edge of the cam.

References Cited in the file of this patent

UNITED STATES PATENTS

| | | |
|---|---|---|
| 1,606,086 | Kruse | Nov. 9, 1926 |
| 2,298,366 | Gladfelter et al. | Oct. 13, 1942 |
| 2,741,292 | Butters | Apr. 10, 1956 |
| 3,033,264 | Henrickson | May 8, 1962 |